Nov. 6, 1923.
F. R. MILLER
SHEET OF MUSIC
Filed March 2, 1922
1,473,495
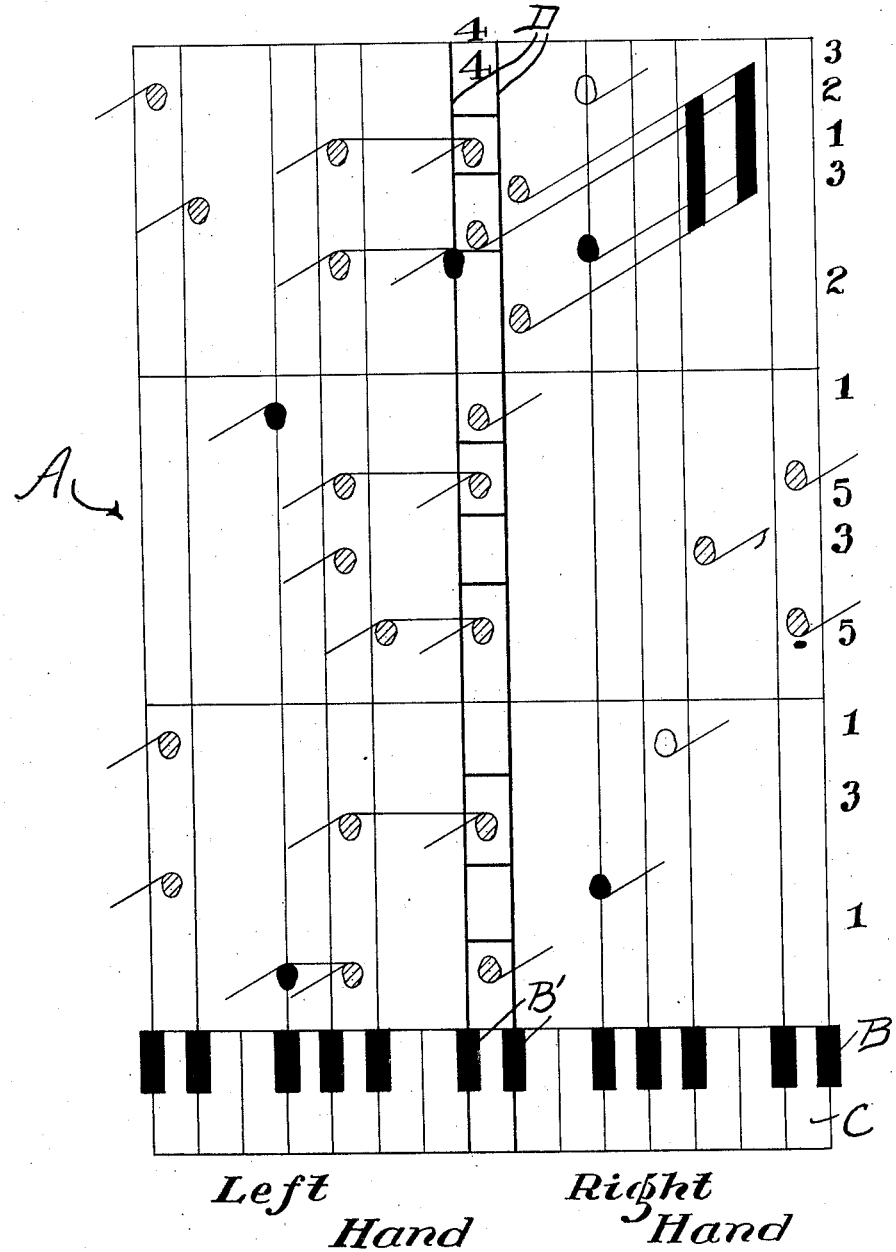
INVENTOR
FRED R. MILLER
BY
ATTORNEYS Patented Nov. 6, 1923.

1,473,495

UNITED STATES PATENT OFFICE.

FRED R. MILLER, OF SAN FRANCISCO, CALIFORNIA.

SHEET OF MUSIC.

Application filed March 2, 1922. Serial No. 540,501.

*To all whom it may concern:*

Be it known that I, FRED R. MILLER, a subject of the King of England, and a resident of San Francisco, county of San Francisco, and State of California, have invented a new and useful System of Sheets of Music, of which the following is a specification:

My invention relates in general to music and has reference more particularly to a new and simplified staff for pianoforte music.

The primary object of my invention is to provide an improved simplified staff from which pianoforte music may be read by persons unfamiliar with the theory and technique usually required before music can be read and played with any degree of success.

The principal feature of my invention consists primarily in a staff having a plurality of parallel lines and spaces with the lines corresponding to the black keys of a piano keyboard and the spaces between the lines corresponding to the white keys of a piano keyboard. The staff as stated is presented vertically on the music sheet and the lines at the bottom of the staff terminating in alinement with a printed representation of the piano keyboard so that the lines and spaces may be readily observed as corresponding to the keys. A further feature consists in printing a plurality of these staffs on a sheet of music and the notes which are arranged both on the lines and in the spaces are adapted to be read downwardly from the top of the staff so that the player may instantly identify the written note with the keyboard and uses those keys on the piano keyboard, as indicated by the position of the notes on the staff.

Further features of the invention will be described as the description now proceeds with reference to the illustrative embodiment shown in the accompanying drawing, in which the figure represents a portion of the staff made in accordance with the theory of the invention.

Referring now to the drawing in detail, (A) represents the staff which may be printed or otherwise displayed on a music sheet with the same consisting of a plurality of printed lines arranged in alternating groups of twos and threes with the spaces between groups of two lines and the spaces between the groups of three lines arranged equi-distant apart and with larger spaces between the groups of lines of substantially the same width but alternating or rather separating the different groups. In other words the lines represent as previously stated the black keys (B) of the piano keyboard with the spaces between the lines representing the white keys (C) of the piano keyboard. The pictorial representation of the keyboard is printed at the lower termination of the lines and spaces as shown. Arranged in the middle of the staff and extending vertically thereof are two heavy black lines (D) the same corresponding to the black keys C sharp and D sharp shown as at (B') of the piano keyboard and dividing the staff vertically into a left and right hand side. This leaves a majority of the notes which are to be played with the left hand to the left of the dividing lines of the staff and those notes which are to be played with the right hand to the right of the dividing lines of the staff. This, of course, cannot apply in every instance, particularly since the keys C sharp and D sharp and the white key, D natural, between the two must be used for some notes therefore, those notes corresponding to either of these three keys are placed either between the two heavy black lines corresponding to the white key, D natural, between the keys, C sharp and D sharp, and those notes which are to be played by either of the keys C sharp and D sharp are placed on either one of the heavy black lines as the case may be.

As a further indication and precaution to insure that the right keys on the keyboard are used to play the proper notes all notes which are to be played with the left hand are written with their stems turned to the left and all notes which are to be played with the right hand are written with their stems turned to the right. This is quite an advantage since in playing some pieces it may be necessary to cross the hands and play some of the right hand keys with the left hand and the left hand keys with the right hand. Therefore any notes which are on the right of the dividing lines of the staff with their stems turned to the left are to be played with the left hand but on the right hand keys of the keyboard.

All notes which are to be played on the white keys irrespective of their position on the staff may be either colored white or left blank within their circular outline and all notes that are to be played on the black keys are made black as shown.

As a convenient means for indicating to the player which finger should be used to manipulate the keys, numbers may be arranged along the vertical side of the staff opposite each of the notes with the number (1) corresponding to the thumb, (2) the index finger, et cetera, and then again at the top of the staff the time may be given, such as $\left(\frac{4}{4}\right)$ time.

From the above it will be readily seen that any one regardless of their lack of musical knowledge may easily acquire the knack of reading the notes and manipulating the keys of the keyboard to produce the music written by the notes.

I claim:

1. A sheet of music having a staff for musical notation comprising a plurality of groups of continuous parallel lines with spaces between the lines of each group and between the groups, a representation of a piano keyboard at the bottom of the said staff with the said lines terminating at the black keys thereof and the said spaces terminating at the white keys thereof, two two spaced apart and relatively heavy lines separating the staff into right and left parts, said lines terminating at the two middle black keys of the said keyboard representation and the space between said lines corresponding to the white key of said keyboard between said black keys, and notes on the lines of said staff and in the spaces between the same, said notes indicating by their structure certain of the keys on said keyboard and further including stems some of which being turned to the left to indicate keys to be played by one hand and others turned to the right to indicate keys to be played by the other hand.

2. A sheet of music having a staff for musical notation comprising a plurality of groups of continuous parallel lines with spaces between the lines of each group and between the groups, two of said lines being made in the middle of said staff and being relatively heavy as compared to the other of the lines and dividing the staff into two parts, a representation of a piano keyboard at the bottom of the staff with the lines terminating at the black keys and the spaces between the lines terminating at the white keys thereof, notes on said staff, each note having a stem, the stems on some of the notes being turned to the left to indicate keys to be played by one hand and the stems on others of the notes turned to the right to indicate keys to be played by the other hand, substantially as and for the purpose described.

FRED R. MILLER.